(No Model.)  2 Sheets—Sheet 1.
C. MATTISON.
COMBINED CHAMFER CUTTER AND LATHE.
No. 431,525.  Patented July 1, 1890.
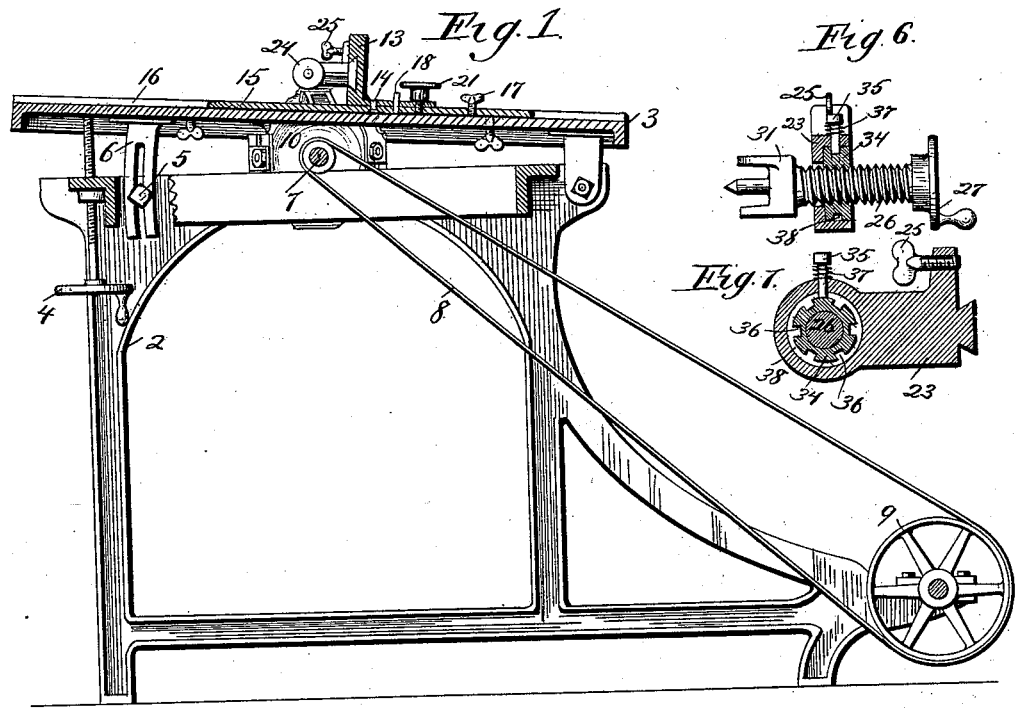
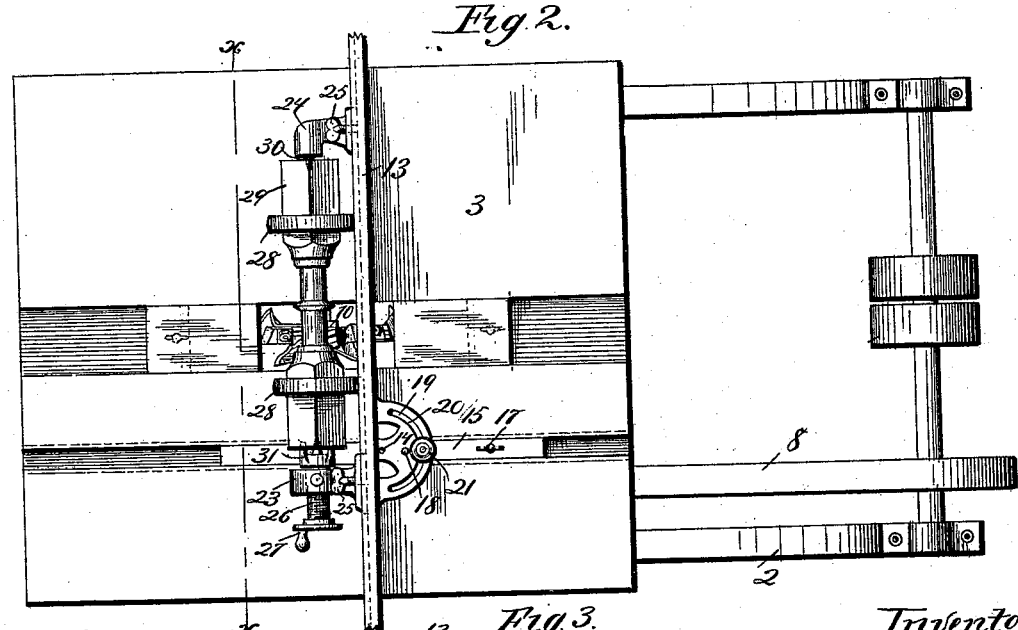
Witnesses:
J. Jessen
A. M. Gaskill
Inventor
Christen Mattison
By Paul & Merwin attys (No Model.)
2 Sheets—Sheet 2.

C. MATTISON.
COMBINED CHAMFER CUTTER AND LATHE.

No. 431,525.
Patented July 1, 1890.

Witnesses
J. Jessen
L. M. Gaskill

Inventor:
Christen Mattison
By Paul —— Attys.

UNITED STATES PATENT OFFICE.

CHRISTEN MATTISON, OF MINNEAPOLIS, MINNESOTA.

COMBINED CHAMFER-CUTTER AND LATHE.

SPECIFICATION forming part of Letters Patent No. 431,525, dated July 1, 1890.

Application filed September 18, 1889. Serial No. 324,300. (No model.)

*To all whom it may concern:*

Be it known that I, CHRISTEN MATTISON, of Minneapolis, in the county of Hennepin and State of Minnesota, have invented a certain new and useful Combined Chamfer-Cutter and Lathe, of which the following is a specification.

The object of my invention is to provide improved means for cutting a chamfer or bevel on strips or pieces of wood designed to be used in finishing buildings, at the same time finishing said chamfers at the ends in any desired ornamental design, and also to form spindles or columns in varied designs, either round, as in an ordinary lathe, or polygonal in cross-section. This work of chamfer-cutting and also of turning has usually been done by hand, requiring a great amount of labor and skill to accurately and nicely finish the ends of chamfers or the various parts of the turned spindle or column, while the work of forming said columns or spindles with a square or polygonal finish has been extremely difficult. All of such work, however, is rapidly and accurately done by the use of my improved device in any desired form or finish.

My invention is further an improvement upon a certain prior invention of mine, for which I have applied for Letters Patent of the United States, Serial No. 310,542, filed May 13, 1889, and allowed August 8, 1889.

Figure 4:
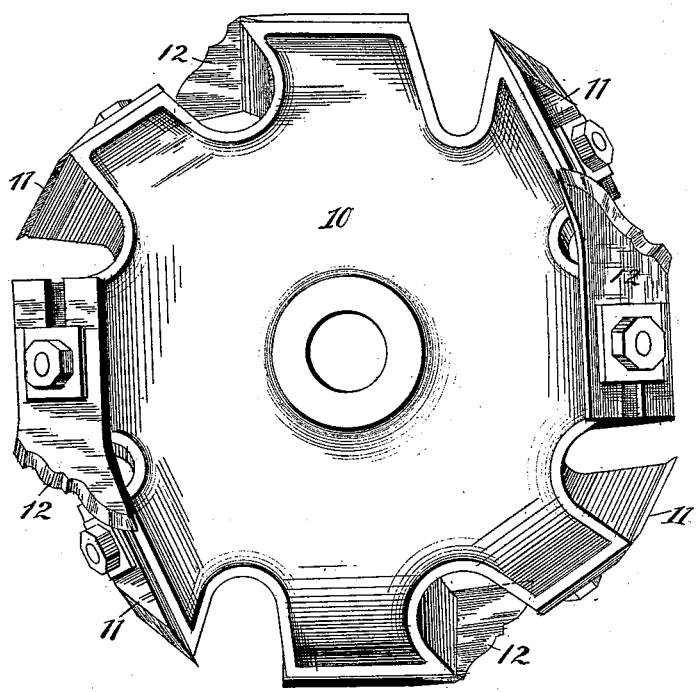
Figure 5:
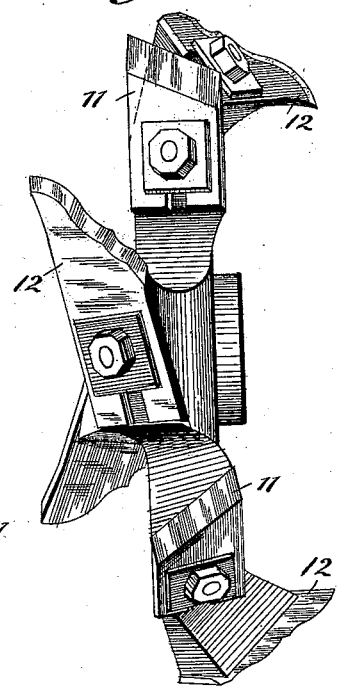
Figures 8, 9:
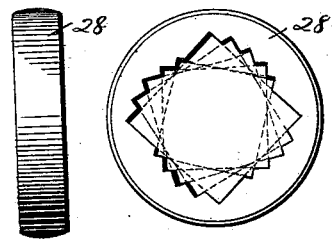
Figure 11:
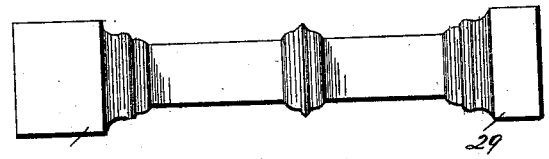
Figure 12:
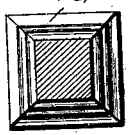
Figure 13:
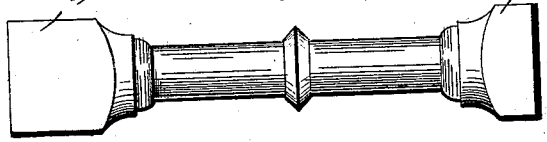
Figure 14:
Figure 15:
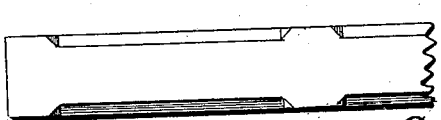

In the accompanying drawings, forming a part of this specification, Figure 1 is a side elevation of my improved machine, the frame being shown in section. Fig. 2 is a plan view of the same adjusted for use as a lathe. Fig. 3 is a detail cross-section of the table on line *x x* of Fig. 2, showing the gage-plate or stop secured thereto. Fig. 4 is a side elevation of the cutter-head, showing the arrangement of the knives thereon. Fig. 5 is a front elevation of the same. Figs. 6 and 7 are details of the head-stock and mandrel. Fig. 8 is a side view of the turning-ring adapted to be slipped upon a piece of wood to guide it in the operation of being turned. Fig. 9 is a front elevation of the same, and Fig. 10 an elevation of a modified form of the same. Figs. 11 and 12 are respectively a front elevation and cross-section of a square spindle as shaped by my machine. Figs. 13 and 14 are respectively an elevation and cross-section of a turned spindle formed by my machine. Fig. 15 is a plan view of a strip of wood having chamfers or bevels formed by my machine.

In the drawings, 2 represents the frame of the machine, of any suitable construction, having the adjustable table or top 3, upon which the work rests. This table is preferably pivoted or hinged to the rear of the frame and its front adapted to be raised or lowered by means of the adjusting-screw 4, and may be secured in any desired position by means of the set-screw 5 engaging the slotted standard 6 on the under side of the table.

Mounted in suitable bearings transversely of the frame is the shaft 7, adapted to be driven by any suitable power, as by means of the belt 8 and the drum 9, connected to continuously-running power. Secured upon the shaft 7 is the cutter-head 10, which is adapted to be rotated through a slot in the table, whereby its knives are brought in contact with the work resting upon the table. The cutter-head 10 is provided upon its periphery, preferably, with four series of inclined surfaces, which are inclined toward the axis of the cutter-head, the surfaces being preferably alternately inclined in opposite directions. Upon the two series of inclined surfaces having the less incline to the axis of the cutter-head are arranged the right and left knives 11, while upon the other series of plane surfaces are arranged the right and left hand finishing-knives 12. These knives are so secured upon the inclined surfaces and furnished with inclined cutting-edges that they strike the wood in operation with a drawing cut, the edges of the knives 11 being preferably straight in ordinary use and so adjusted as to cut in perfect alignment with each other and parallel with the shaft of the cutter-head, whereby the straight part of the work is finished, as in cutting a chamfer or the body of a spindle, while the finishing-knives 12 are formed with curved or rounded cutting-edges in any desired design, whereby a corresponding finish is given to the ends of the chamfer or the ends of the spindle-center in doing lathe-work. The depth of cut of the knives of the cutter-head is adjusted by means of the adjusting-screw 4 to raise or lower the table over the cutter-head.

In order to hold the stock upon the table in position to be shaped by the cutters, I prefer to arrange transversely of the table the gage or stop-plate 13, which is adjustably secured to the table by being pivoted at 14 to the dovetailed slide 15, sliding in the groove 16 and adjustable in any desired position by means of the set-screw 17. In order to hold the stop-plate 13 exactly at right angles with the slide 15—the position in which it is commonly placed—I prefer to provide a pin 18, which may be passed through the hole in the plate 19 and into a hole or socket in the slide 15, whereby the stop-plate is held firmly in such position without the necessity of careful adjustment to determine the angle. In some classes of work, however, it is desirable to secure a diagonal cut or finish to the stock. To this end I prefer to arrange the gage or stop plate 13 so that it may be set at any angle with reference to the plane of the cutter-head. I do this by providing a circularly-curved slot 20 in the plate 13, through which a set-screw 21 passes into the slide 15, by means of which the gage may be turned about its pivot to any desired angle and firmly secured.

In order to use the machine as a lathe, I provide in the face of the gage-plate dovetailed grooves 22, arranged longitudinally thereof, in which are arranged the head and tail stocks 23 and 24, being adjusted in any desired position by means of the set-screws 25. The mandrel 26 may be provided with a crank 27 for hand-turning, or rotated in any other suitable manner. In order to firmly support the stock while being turned and prevent any spring to cause irregular cutting, I prefer to provide loose rings 28, of such size that when placed upon the table with their periphery in contact with the table and with the gage their centers will be in line with the lathe-centers. The center of each of the rings is cut out in irregular form, as shown by detail, Figs. 8 and 10, and adapted to fit upon stock of different sizes. As shown in the drawings, the ring is adapted to be used upon square stock of various sizes, as indicated by the oppositely-arranged notches of the opening and the dotted lines connecting the same. It is obvious, however, that the rings may be formed to fit upon stock of different shapes, as desired. By the use of these rings upon the stock it is steadied while in the lathe, and if necessary the rings may be used without the supporting-centers to hold the stock in position to be shaped by the cutters by simply turning them in the position shown in Fig. 2, and thus rotating the stock or piece of wood above the cutter-head.

Figure 10:
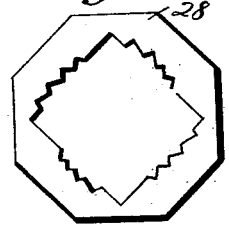

In order to shape a piece of stock into octagonal or other polygonal form, rings may be provided to be slipped upon it having their peripheries of the form in which it is desired to shape the work—as, for example, that shown in detail, Fig. 10, in which the ring is octagonal in form. In detail, Figs. 11 and 12, is shown a specimen of the work of the machine in cutting a square spindle, showing the ornamental finish given it, while in Figs. 13 and 14 is shown a specimen of a turned spindle, while Fig. 15 shows the work of chamfering.

In operation a piece of stock to be chamfered is pressed against the gage-plate while resting upon the table, the gage being set in such position as to allow the knives of the cutter-head to strike the corner of the piece of stock and to cut the same to any desired depth. The work is then moved to and fro, so as to cut the chamfer to the desired length, the body of the chamfer being cut straight by the cutters 11 and the ends of the chamfer shaped by the cutters 12. The work of turning is accomplished by setting the gage so that the lathe-centers are in approximately a vertical plane passing through the axis of the cutter-head, the table being adjusted to regulate the depth of cut required. The rings are then slipped upon the stock 29, which is then secured in the ordinary manner upon the center 30 and the chuck 31. The mandrel then being turned, the stock is rotated above the cutter-head, the knives of which in their rotation serve to cut or turn the stock, as in a lathe.

In shaping a spindle square or in any other polygonal form, if the piece of stock is of the same number of sides as it is desired to shape the spindle-center, the piece is passed to and fro over the cutter-head, sliding on the table upon one of its sides or faces, then turned to the next face, and passed over the cutter-head, and so on successively, when the cutter will have formed the spindle-center with the same number of sides as the stick in its original form. If it is desired, however, to form the spindle-center with a different number of sides from that of the stick or piece of stock, polygonal rings of the same number of sides as it is desired to form the spindle with are slipped upon it, and then it is passed to and fro over the cutter-head, being turned upon the different sides of the rings and the desired form obtained.

In detail, Figs. 6 and 7, are shown an improved construction of head-stock and mandrel. The mandrel 26 is threaded in the slotted ring or block 34, which turns in the head-stock, being held in position by means of the spring-controlled pin 35, which engages with the slot 38 in the periphery of the ring. In the bottom of the groove are arranged a number of depressions 36, into which the pin 35 can be pressed against the tension of its spring 37 and thus prevent the rotating of the ring. In fitting a piece of work upon the centers the pin is depressed to enter one of the depressions or sockets, and the mandrel, then being rotated by its handle, is carried forward, so as to force the center chuck into the end of the stick as the screw engages with the block or ring 34, which is held from turning by the pin 35. When the stick has been secured, the pin 35 is released from pressure, when the spring 37 throws it out of the socket, but not far enough to carry it out of the groove 38. Upon rotating the mandrel the block will turn in its bearings, as less friction is offered to its rotation than there is to the screw passing through the block. The operation of removing the finished work from the centers is simply the converse of this.

I claim—

1. In a device of the class described, a cutter-head provided upon its periphery with four series of oppositely-inclined plane surfaces, two of said series being inclined to the left and two to the right, each oppositely-inclined pair forming equal angles with the shaft of the cutter, but different angles from the other pair, knives arranged upon the surfaces having the less incline, provided with straight inclined cutting-edges adapted to cut in alignment with each other and parallel with the shaft of the cutter-head, and knives arranged upon said other plane surfaces, provided with inclined cutting-edges of ornamental design, combined and adapted to be operated substantially as described.

2. In a device of the class described, provided with a suitable table or other support, the combination of a cutter-head having two series of oppositely-inclined knives adapted to cut in alignment with each other and parallel with the cutter-head shaft, and other series of oppositely-inclined knives of ornamental design, adapted to finish the ends of the cut of the other knives, and a gage secured upon said table and laterally and angularly adjustable with reference to the plane of said cutter-head, substantially as described.

3. In a device of the class described, the combination, with a cutter-head provided with series of oppositely-inclined knives cutting in alignment with each other and series of oppositely-inclined finishing-knives, of an adjustable table or support through an opening in which said cutter-head is arranged to rotate, a stop adjustably connected to said table, and head and tail stocks carried by said stop and adjustable longitudinally thereof, substantially as described.

4. In a device of the class described, the combination, with a suitable table, of a cutter-head rotating through an opening in the same and provided with series of oppositely-inclined knives having inclined cutting-edges, an adjustable gage arranged upon said table parallel with the shaft of the cutter-head, and rings adapted to be fitted upon a piece of stock to be formed and to be turned with their peripheries bearing upon said table and against said gage, whereby the piece of stock is formed by the knives of the cutter-head into the same shape in cross-section as said rings, substantially as described.

5. In a device of the class described, the combination, with the table 3 and the gage 13, adjustably secured thereto, of the cutter-head 10, having peripheral series of oppositely-inclined surfaces, the series of right and left hand knives 11, having inclined straight cutting-edges, and the series of right and left hand finishing-knives 12, having cutting-edges of ornamental design, substantially as and for the purposes set forth.

6. The combination, with the table 3, of the cutter-head 10, rotating in an opening in the same, the gage 13, angularly and laterally adjustable upon said table with reference to the shaft of said cutter-head, the head and tail stocks 23 and 24, longitudinally adjustable on said gage, and the rings 28, adapted to be secured upon the piece of stock and to be rotated in bearing-contact both with said table and said gage, substantially as described.

7. In a device of the class described, the cutter-head 10, having peripheral series of oppositely-inclined surfaces, the series of right and left hand knives 11, having inclined straight cutting-edges, and the series of right and left hand finishing-knives 12, having cutting-edges of ornamental design, substantially as and for the purpose set forth.

8. In a device of the class described, the combination of the cutter-head, the adjustable gage, the head and tail stocks adjustably secured thereto, the screw-threaded mandrel, the screw-threaded ring or block engaged by the mandrel, adapted to be rotated in the head-stock and provided with a peripheral groove and sockets in the bottom of said groove, and a spring-controlled pin arranged in the head-stock and projecting into said groove and adapted to be depressed against the tension of its spring into one of said sockets, substantially as described.

In testimony whereof I have hereunto set my hand this 11th day of September, 1889.

CHRISTEN MATTISON.

In presence of—
T. D. MERWIN,
A. M. GASKILL.